United States Patent [19]
Lyszczek

[11] 3,815,755
[45] June 11, 1974

[54] ADJUSTABLE GLASS STAKE
[76] Inventor: Stephen W. Lyszczek, 5348 Vineland Ave., North Hollywood, Calif. 91601
[22] Filed: May 26, 1972
[21] Appl. No.: 257,233

[52] U.S. Cl. .................................... 211/41, 211/51
[51] Int. Cl. ............................................. A47g 19/08
[58] Field of Search .......................... 211/41, 51, 13

[56] References Cited
UNITED STATES PATENTS
| 1,893,227 | 1/1933 | Cohen-Venezian | 211/41 X |
| 2,518,624 | 8/1950 | Kraft | 211/13 |
| 2,919,811 | 1/1960 | Schodorf | 211/41 |

FOREIGN PATENTS OR APPLICATIONS
| 35,200 | 7/1956 | Germany | 211/41 |
| 219,494 | 1/1962 | Austria | 211/41 |

Primary Examiner—Roy D. Frazier
Assistant Examiner—Abraham Frankel
Attorney, Agent, or Firm—Lyon & Lyon

[57] ABSTRACT

An adjustable glass stake for securing glass panes against a glass rack of the type adapted to be mounted on the bed of a truck which has a channel therein which extends the length of the stake. Within each channel is placed a plurality of locking members which can be set at any position in the channel along the stake. Each locking member has a holding arm pivotally connected thereto, and each pair of adjacent holding arms are pivotally secured at their opposite ends to a holding pad. The holding pad provides the surface which presses against the glass panes. This surface is adjustable by uniformly altering the distance in the channel between the locking members to which the particular pair of holding arms are secured, which arms in turn support a single holding pad.

4 Claims, 4 Drawing Figures

PATENTED JUN 11 1974 3,815,755

ADJUSTABLE GLASS STAKE

BACKGROUND OF THE INVENTION

There are currently in use several variations of glass stakes which are mounted upon the bed of a truck and used for holding large panes of glass against a sloped rack. Such makes generally vary only in the hardware which provides the pressing or securing surface. Typically, a plurality of heavy wooden stakes are used to support a pane or panes of glass and individual support or holding members are bolted to each stake. Each holding member has a slot therein and is bolted to the stake through the slot. The holding members then collectively provide a surface which presses against the glass, holding the panes firmly against the resting surfaces or rack which is mounted on the truck bed walls. When such a rack is being used on a truck, the stakes are put in place and the holding members are individually pushed against the glass panes and the bolt tightened, thereby locking a particular holding member in place. This process is carried on with each individual holding member and the glass is secured. Such racks have several disadvantages in that they are quite heavy, bulky, awkward and provide an extremely inflexible holding surface. Such racks have several separate pieces which can be easily misplaced. Each support member is movable only with respect to its locking bolt. Therefore, when the glass truck is carrying several panes of glass, each support member will protrude beyond the stake, outwardly of the truck, thereby creating a safety hazard. In addition, since the support members are movable only with respect to the particular locking bolt, the overall surface is very rigid in that there are no provisions for changing the positioning of the multiple holding pad configuration and therefore cannot be adjusted to better support glass panes of varying dimensions.

It should be further noted that the glass stakes currently being used employ holding pads with curved contact surfaces. Such surfaces provide a very small area of actual contact between the pad and the glass. This reduced support area lowers the effectiveness of the overall holding surface and the chance of glass breakage is increased. To offset the reduced supporting area of the curved pads, quite often more pads are added. This increases the time and difficulty involved in setting up and adjusting the overall contact surface.

It is therefore the principal object of this invention to provide a stake adapted to be mounted in the bed of the truck for supporting glass panes which is highly adjustable to securely support panes varying in number and size.

It is a further object of this invention to provide a glass stake in which all adjustments are simple to accomplish and can be carried out by hand in the shortest possible time.

It is still a further object of this invention to provide a glass stake which avoids scratching and other injury to glass panes supported by the rack.

It is another object of this invention to provide a glass stake which is of simple construction and economical to manufacture.

It is yet another object of this invention to provide a glass stake in which the holding members do not protrude beyond the stake when heavily loaded.

These and other objects and advantages of the present invention will become apparent from the following detailed description taken in conjunction with the accompanying drawings.

SUMMARY OF THE INVENTION

Briefly, the stake carries several holding pads. The holding pads are carried by locking members which are slidable along the stakes. The locking members can then be so positioned along the stakes to set the holding pads in such a way to form a holding surface at almost any desired angle and position relative to the stakes to accommodate glass panes varying in size and number.

IN THE DRAWINGS

Figure 1:
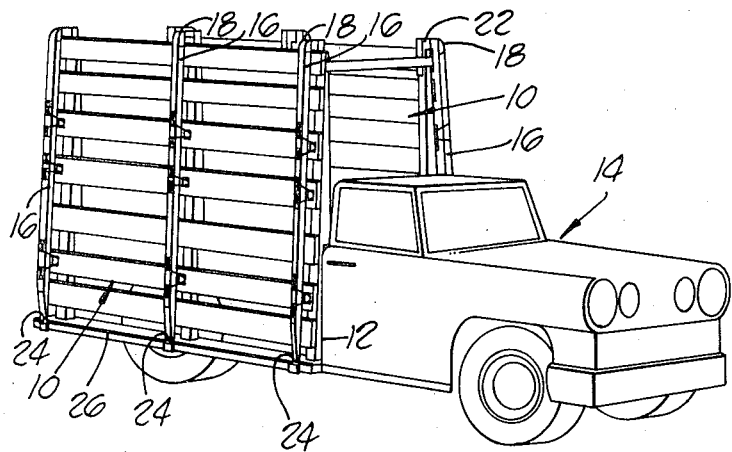
FIG. 1 is a perspective view of a truck carrying a plurality of stakes embodying this invention.
Figure 3:
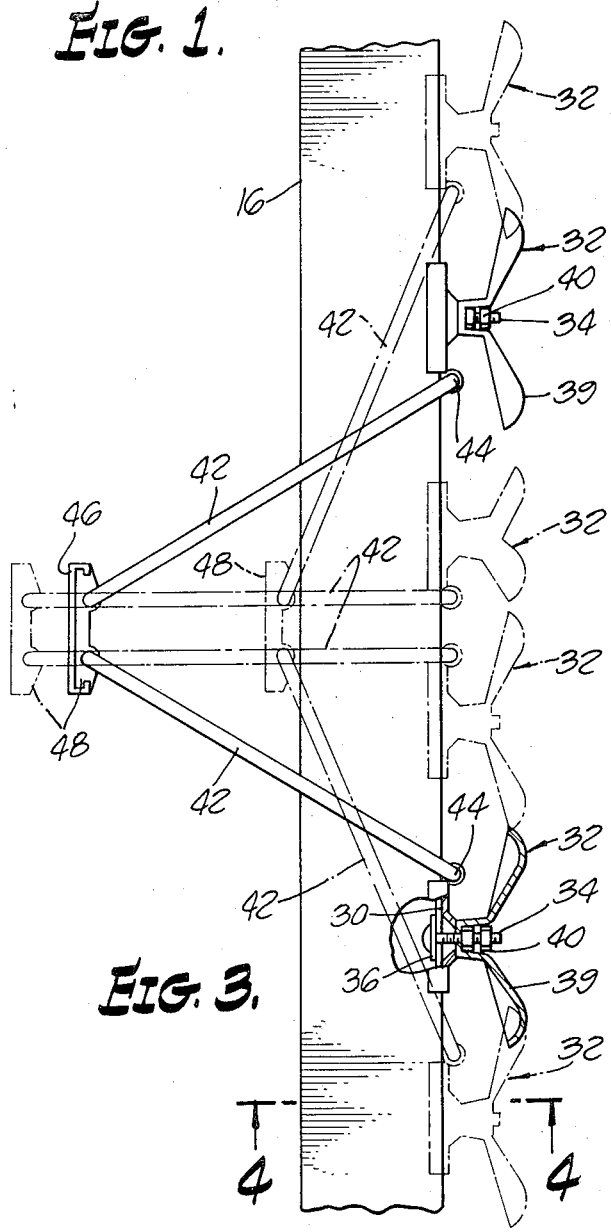
FIG. 3 is a side elevation of a portion of a single stake demonstrating the relative action of a locking member and a holding pad.
Figure 2:
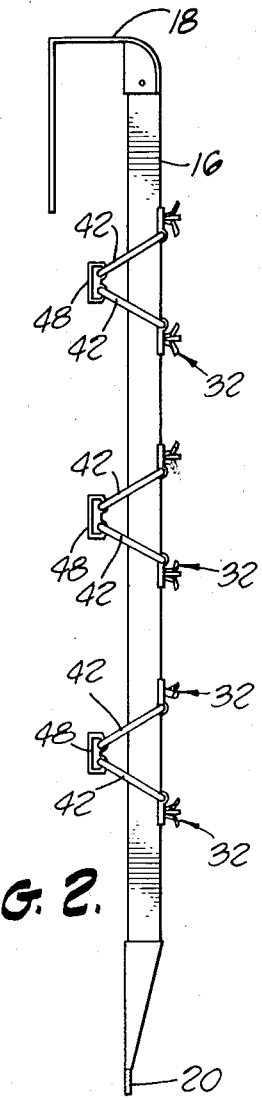
FIG. 2 is a side elevation of a single stake showing a plurality of locking members and the supporting arms and pads supported thereby.

Referring now in detail to the drawings, a glass rack 10 is mounted on each of the side walls 12 of truck 14. After the desired number of glass panes (not shown) to be transported have been placed against the racks 10, a plurality of adjustable glass stakes 16 are positioned against the glass panes thereby holding the panes firmly against the racks. Each stake has an "L" shaped support member 18 at one end thereof and a projection 20 secured to the opposite end of the stake 16. In positioning the stakes against the glass panes, the "L" shaped support members 18 are fitted about the upper frame 22 of the glass rack 10 and projections 20 are placed within apertures 24 in the base portion 26 of the glass rack 10.

Figure 4:
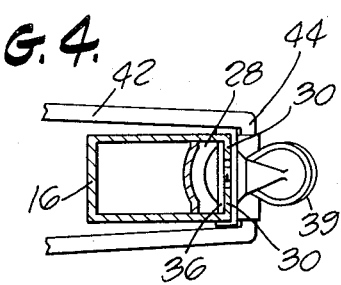
FIG. 4 is a sectional view of a stake taken along 4—4 in FIG. 3.

Each stake 16 has an open channel 28, which extends along the longitudinal axis of the stake. This channel is best seen in FIG. 4. On either side of the opening of channel 28 and extending the length thereof are flange portions 30, which are integrally formed with stakes 16. Riding within each channel 28 are a plurality of locking members 32. In the drawings, three pairs of locking members are shown, but a different number of pairs could be used if so desired. Each locking member is comprised of a bolt 34 which extends outwardly from channel 28 and through an inner locking plate 36 which rides within channel 28 and is held therein by flange portions 30. A large self-locking wing nut 39 is threadably engaged with the end of bolt 34 which protrudes outwardly from channel 28 between flange portions 30. Upon loosening the wing nut, the locking member 32 is free to slide within channel 28. Tightening the wing nut causes the nut and inner locking plate 36 to press against the flange portions 30, thereby securing the locking member in place. A locking nut 40 is threadably engaged with bolt 34 and spaced from wing nut 39 to provide self-locking characteristics to the wing nut and to prevent the wing nut from accidentally coming off the bolt during transit as a result of road vibration. The use of a large wing nut allows the locking members to be readily moved and secured by hand in the shortest time and with the least amount of effort.

A holding arm 42 is pivotally secured to each locking member 32. In the preferred embodiment of the invention, each arm is trapezoidal in shape, with the smaller of its parallel sides 44 being pivotally mounted on locking member 32, as shown in FIG. 4, and the longer of the parallel sides (not shown) being pivotally secured to the rearward side of a holding pad 48. The holding pads provide the actual surface which presses against the glass panes, securing them on side walls 12. A rubber or otherwise soft outer surface 46 is provided on the holding pads to prevent any scratching of the glass panes. The use of trapezoidal holding arms is preferred because it allows the holding pads 48 to be positioned on the opposite sides of stakes 20 from locking members 32, thereby preventing interference therewith. In addition, they are highly adaptable for supporting a larger holding pad, due to the presence of a longer side, while maintaining the holding arms close to the stakes, thereby reducing the bulkiness of rack 10. Each holding pad 48 is pivotally secured, as described above, to two adjacent holding arms, as shown in the drawings, thereby providing maximum flexibility in the orientation of the pads and, therefore, in the overall resting surface. Through the relative positioning within channel 28 of adjacent locking members 32 which are connected to a single holding pad through holding arms 42, that support pad can be locked at any desired distance from the stake, up to a distance equal to the length of the arm. This flexible locking action combined with the fact that the pads are rotatable about the longer side of 42, provides an overall holding surface which is variable with respect to angle and distance from the stakes, thereby making the glass stake 16 highly suitable for securely supporting glass panes varying in number and size.

Various changes and modifications may be made in carrying out the present invention without departing from the scope and spirit thereof. Insofar as these changes and modifications are within the purview of the appended claims, they are to be considered as part of the invention.

I claim:

1. An apparatus for holding panes of glass against a glass support of the type adapted to be mounted on a truck comprising:
   a. a stake adapted to be mounted on the side of a truck;
   b. a plurality of locking members carried by said stake, said locking members being linearly movable along the longitudinal axis of said stake and adapted to be secured at any point therealong;
   c. a plurality of holding arms, only one of said arms being pivotally secured to each of said locking members;
   d. a plurality of holding pads for providing a surface for pressing against said glass panes, each of said pads being pivotally connected to a pair of adjacent holding arms whereby the relative positioning of the locking members to which said pair of holding arms are secured determines the orientation of said holding pad with respect to said stake.

2. The combination of claim 1 wherein said holding arms are trapezoidal in shape, the parallel sides of each being of unequal length, the shorter of the parallel sides being pivotally connected to said locking members and the longer of the parallel sides being pivotally secured to the holding pads.

3. An apparatus for holding panes of glass against a glass support of the type adapted to be mounted on a truck comprising:
   a. a stake adapted to be mounted on the side of a truck, said stake having an open channel therein extending along the longitudinal axis of said stake and a flange portion adjacent the open side of said channel;
   b. a plurality of locking members carried by said stake, a portion of each of said locking members being maintained within said channel by said flange portion whereby said locking members are slidable along the longitudinal axis of said stake;
   c. only one holding arm pivotally secured to each of said locking members;
   d. a plurality of holding pads for providing a surface for pressing against said glass panes, each of said pads being pivotally connected to a pair of adjacent holding arms whereby the relative positioning of the locking members to which said pair of holding arms are secured determines the orientation of said holding pad with respect to said stake.

4. The apparatus of claim 3 wherein said holding arms are trapezoidal in shape with the parallel sides of each being of unequal length, the shorter of the parallel sides being pivotally connected to said locking members and the longer of the parallel sides being pivotally secured to the holding pads.

* * * * *